July 5, 1955 H. E. BESTE 2,712,606
BLOCKING TUBE OSCILLATOR
Filed Oct. 7, 1949
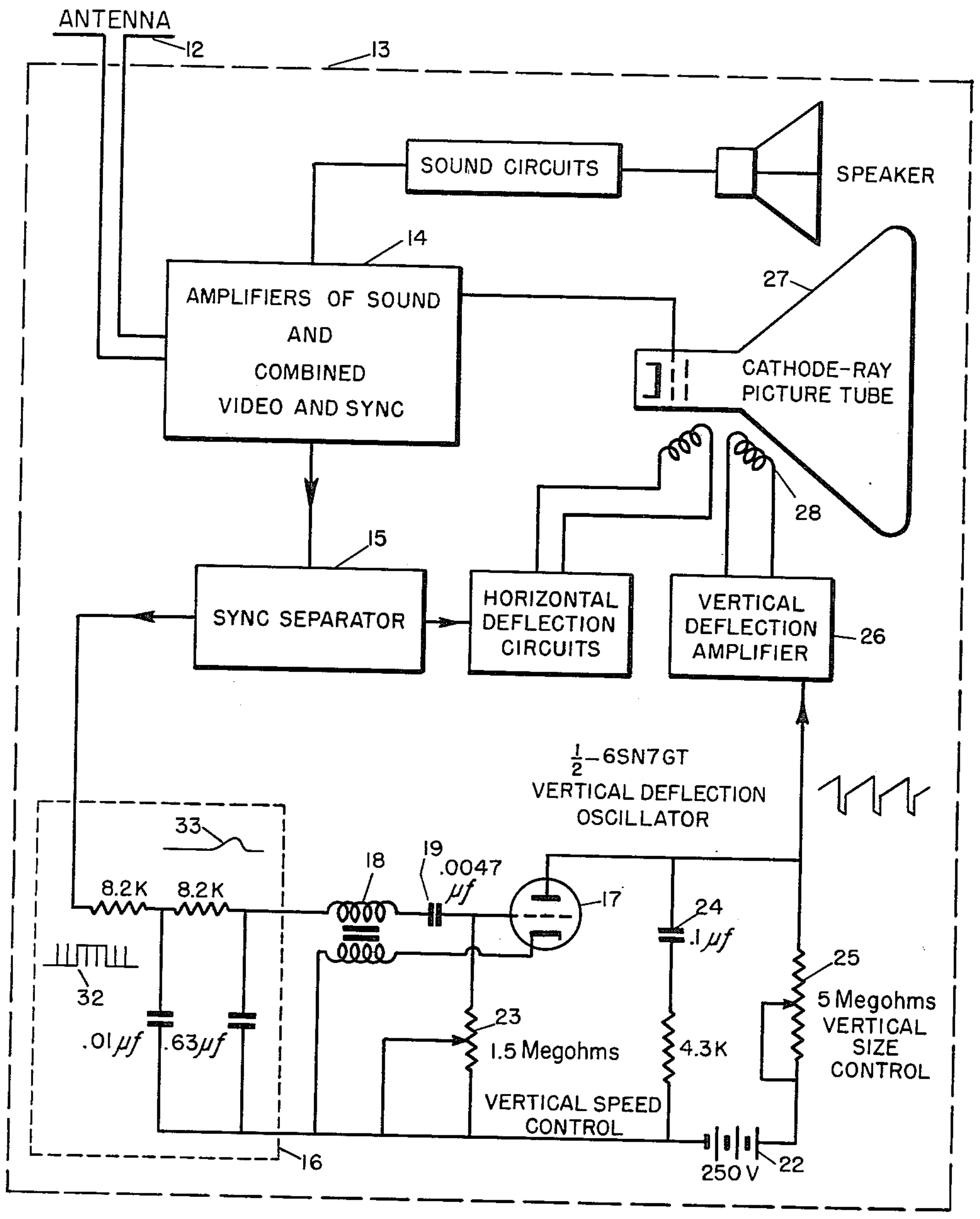
INVENTOR.
HAROLD E. BESTE
BY *Darby + Darby*
ATTORNEYS United States Patent Office 2,712,606
Patented July 5, 1955

2,712,606

BLOCKING TUBE OSCILLATOR

Harold E. Beste, Verona, N. J., assignor to Allen B. Du Mont Laboratories, Inc., Passaic, N. J., a corporation of Delaware Application October 7, 1949, Serial No. 120,120

2 Claims. (Cl. 250—36)

This invention relates to oscillators and more particularly to blocking oscillators such as are used in television apparatus and the like.

In oscillators of this type which are in common use the grid and plate circuits of a thermionic triode are tightly coupled together through a transformer to form an oscillator, and time constant elements comprising a resistor and a capacitor is connected to the grid circuit so that the oscillator will block after one cycle. A utilization circuit, providing a deflecting or scanning wave for a cathode ray picture tube for instance may be placed in the plate circuit, the pulses of plate current creating in the utilization circuit a sawtooth voltage wave across a condenser, or an impulse wave across a resistor. Control of the repetition rate or speed of the scanning wave may be accomplished by means of an adjustment of the time constant resistor in the grid circuit. Control of the amplitude of the scanning wave may be accomplished by an adjustable resistance in the utilization circuit. It is customary to control the exact time occurrence of the blocking oscillator by means of synchronizing pulses, these being either run directly into the grid circuit of the oscillator tube, or used to derive a frequency controlling voltage for the oscillator, which voltage depends upon the relative phase of the oscillator and synchronizing pulses.

In oscillators of this type where a synchronizing pulse is transmitted in part through the medium of an electromagnetic wave between a television picture transmitter and a receiver, it has been found that noise impulses or small components thereof can be coupled capacitively through the coupling transformer from the synchronizing circuit at the grid of the oscillator tube to the utilization circuit at the plate, and that these noise impulses while not severe enough to cause loss of synchronization, will nevertheless manifest themselves as an annoying jiggle of the picture.

An object of this invention is to provide a scanning oscillator circuit in which the utilization circuit is less susceptible to noise impulses from the synchronizing circuit.

Another object is to provide a circuit where there is less interaction between speed and size controls.

A third object is to provide a sawtooth generating oscillator which requires less external damping than other types.

In accordance with my invention, coupling in the oscillator is made between elements of the oscillator tube other than that to which the utilization network is connected.

The invention can be more clearly understood by referring to the accompanying drawing in which a television receiving system is shown partly as a block diagram and partly schematically.

A transmitted television signal is received on an antenna 12 and brought into a television receiver 13 where it is amplified in a conventional selective amplifier system 14. The synchronization signals are separated from the other television signals in a conventional sync separator 15, all in a manner well known to the art. The vertical synchronization signals are then separated from the horizontal synchronization signals by means of a low pass filter 16 and connected to the grid of the blocking oscillator tube 17 by means of the secondary of a transformer 18 and a time constant condenser 19. The grid of this tube 17 is also connected to the negative end of a source 22 of direct potential through an adjustable time constant resistance 23 which resistance in conjunction with the condenser 19 forms a circuit controlling the blocking repetition rate or scanning speed. The cathode of the oscillator tube is connected through the primary of the transformer 18 to the negative end of the direct potential source 22. The plate of the tube 17 is connected through a saw making condenser 24 to the negative end of the source 22 and through an adjustable resistance 25 to the positive end of this same source 22. The sawtooth wave formed across the condenser 24 is amplified in a conventional vertical deflection amplifier 26 to provide scanning of the cathode ray tube 27 by means of a sawtooth current through a deflection yoke 28.

The operation of the oscillator circuit is as follows: a synchronizing signal 32 from the sync separator 15 passes through the low pass filter 16 and, having the higher frequency components removed, assumes the aspect of a positive peaked wave 33 which drives the grid of the oscillator tube 17 positive causing it to conduct. The conduction current flows through the primary winding of the transformer 18 which because of the secondary winding drives the grid more positive. The action thus becomes unstable until grid current saturation occurs. As soon as current in the tube stops increasing, the grid starts to swing negative and the action becomes unstable in the other direction. The grid, however, swings negative to a point far beyond the cutoff of the tube due to the grid current that was drawn when the grid was positive, charging the condenser 19. The tube is thus cut off during a period when the negative charge on the condenser 19 is leaking off through the resistance 23.

This action takes place between the grid and cathode circuits, it being necessary only that the plate of the oscillator tube 17 be maintained at a substantially positive potential, so that the grid will be driven positive and draw a charge on the time constant condenser 19. In the specific circuit shown, the capacitor 24 forms a reactive utilization circuit. During the short conduction period of the tube the capacitor discharges forming portion of a voltage wave having a steep negative slope. When the tube blocks, the capacitor 24 recharges through the resistor 25 forming a portion of the wave with a more gradual positive slope, the two together forming a sawtooth wave.

The form of blocking oscillator shown is particularly effective in reducing the coupling between the synchronization signal input circuit and the utilization circuit, with consequent reduction in coupled noise, and hence, less vertical jiggle in the picture in the presence of noise.

An additional beneficial effect is provided by the preferred circuit. In adjusting television receivers an adjustment of both vertical size and speed is usually necessary. In the sets of the prior art, if one control was adjusted to its proper value, and the second control was then adjusted to its proper value, it was usually found that the first control had to be readjusted, then the second control, and so forth. This condition, which is called interaction between controls, makes a receiver more complicated to adjust. In the preferred circuit shown there is a considerable improvement in this respect, so that each control can be set independently to its proper value. Thus the vertical size control is a part of the utilization circuit which is electrically isolated from the vertical speed control, a part of the timing circuit of the oscillator.

A further beneficial effect is obtained by using this circuit. Although only one cycle of oscillation occurs in the oscillator tube it is sometimes found that a certain carryover from the oscillation or ringing occurs in the transformer winding. If this continues into the scanning period, irregularities in the top of the picture become apparent and damping resistors must be placed across one of the transformer windings. In the preferred circuit it is found that these irregularities are completely absent, so that external resistors are unnecessary.

Although a specific embodiment of my invention has been shown and described the scope of my invention can best be understood from the following claims.

What is claimed is:

1. An oscillator comprising an electronic tube having a cathode, a control grid, and an anode, a source of voltage having a positive terminal and a negative terminal, a resistance connected between said control grid and said negative terminal, a source of synchronizing signals, a transformer having a first winding connected in series with a condenser between said control grid and said source of synchronizing signals and a second winding connected between said cathode and said negative terminal, a resistance connected between said positive terminal and said anode, and a utilization circuit connected to said anode.

2. The oscillator in accordance with claim 1, in which a resistance and a capacitance are connected between said anode and said negative terminal.

References Cited in the file of this patent

UNITED STATES PATENTS

| | | |
|---|---|---|
| 2,125,732 | Bowman-Manifold et al. | Aug. 2, 1938 |
| 2,212,202 | Faudell et al. | Aug. 20, 1940 |
| 2,254,087 | Percival | Aug. 26, 1941 |
| 2,258,752 | Fewings et al. | Oct. 14, 1941 |
| 2,411,573 | Holst et al. | Nov. 26, 1946 |
| 2,538,261 | Moore | Jan. 16, 1951 |
| 2,544,213 | Bennett et al. | Mar. 6, 1951 |
| 2,564,687 | Guenther | Aug. 21, 1951 |
| 2,609,507 | Schlesinger | Sept. 2, 1952 |

FOREIGN PATENTS

| | | |
|---|---|---|
| 597,652 | Great Britain | Jan. 30, 1948 |

OTHER REFERENCES

Waveforms, vol. 19, Radiation Laboratory Series, by Chance et al., April 1949, pages 230 to 231, published by McGraw-Hill Book Co., New York.